(12) United States Patent
Hoffman (10) Patent No.: US 6,782,591 B1
(45) Date of Patent: Aug. 31, 2004

(54) PUNCH PRESS TOOL

(76) Inventor: Herbert F. Hoffman, 36715 Hoffman La., Platte, SD (US) 57369

( * ) Notice: Subject to any disclaimer, the term of this patent is extended or adjusted under 35 U.S.C. 154(b) by 0 days.

(21) Appl. No.: 10/462,806

(22) Filed: Jun. 17, 2003

(51) Int. Cl.$^7$ .............................................. B23P 19/04
(52) U.S. Cl. ............................ 29/267; 29/268; 81/302; 81/306
(58) Field of Search .................... 29/267, 268, 243.54; 81/302, 306; 254/100, 133, DIG. 1

(56) References Cited

U.S. PATENT DOCUMENTS

| | | | |
|---|---|---|---|
| 246,062 A | | 8/1881 | Blaisdell |
| 289,271 A | | 11/1883 | Kepler |
| 1,106,439 A | | 8/1914 | Conne |
| 2,897,701 A | | 8/1959 | Strnisha |
| 2,986,870 A | | 6/1961 | Blais |
| 3,156,087 A | | 11/1964 | Granberg |
| 3,230,751 A | * | 1/1966 | Smith ........................... 72/124 |
| 3,234,634 A | * | 2/1966 | Johnson ................... 29/243.54 |
| 3,314,320 A | | 4/1967 | Early |
| 3,349,603 A | * | 10/1967 | Lovig ........................... 72/477 |
| 4,137,817 A | * | 2/1979 | Siebol ............................. 85/78 |
| 4,693,406 A | * | 9/1987 | Bartholomew et al. ....... 227/63 |
| 5,148,589 A | * | 9/1992 | Bot .......................... 29/243.54 |
| 5,283,936 A | | 2/1994 | Pickles et al. |

* cited by examiner

Primary Examiner—Robert C. Watson
(74) Attorney, Agent, or Firm—Jacobson Holman PLLC

(57) ABSTRACT

The punch press tool efficiently punches out a sheared sickle blade section bolt or a bolt from which the retaining nut has been removed in an implement using a reciprocating sickle bar. The punch press tool includes an elongated handle having a pair of rigidly connected parallel links pivotally connected to one end thereof to straddle a sickle bar. A removable transverse pin is engaged with end portions of the links in spaced relation to the end of the handle and oriented below the sickle bar when the handle and attached ends of the links are positioned above the sickle bar. The handle includes a radially extending heat treated projecting pointed pin spaced from the pivot axis of the handle to downwardly engage the end of a broken bolt in a sickle bar to force the bolt downwardly out of the sickle bar when the handle is pivoted toward the sickle bar. The handle also includes a protruding surface area on an edge thereof to engage the round head of a new shouldered bolt and upwardly forcing it into the sickle bar opening with the round head of the bolt engaging flush with the bottom of the sickle bar.

20 Claims, 7 Drawing Sheets

PUNCH PRESS TOOL

BACKGROUND OF THE INVENTION

1. Field of the Invention

The present invention relates to a punch press tool for efficiently punching out a broken sickle blade section bolt or such a bolt from which the retaining nut has been removed and pressing in a replacement bolt when replacing a sickle blade section in a windrower, swather, combine, mower or other machine or implement using a reciprocating sickle bar or strap having a plurality of blade sections attached thereto by a pair of shouldered round head bolts and nuts.

2. Description of the Prior Art

When mowing hay, grain crops and the like with a mower, windrower, swather, combine or the like, a reciprocating sickle bar with blade sections mounted thereon is associated with sickle blade guards having ledger plates thereon. Rocks, stumps and other solid obstacles are sometimes engaged causing breakage of a blade section thus necessitating removal of the broken blade section and replacing it with a new one. In some instances, the bolts holding the sickle blade section in place on the sickle bar or strap are broken in which event removal of the broken shouldered bolt is difficult and is frequently accomplished by using a center punch or other similar tool impacted by a hammer or the like. Even if the section blade bolts are not broken, removal of the retaining nuts still requires that force be applied to the upper threaded end of each of the bolts to force the bolts downwardly through the sickle bar or strap. When replacing the shouldered bolt, it is necessary to exert upward force on the rounded head of the bolt to force the bolt into the hole or opening in the sickle bar until the bolt head is flush with the lower surface of the sickle bar. This assures that the shoulder on the bolt is secured frictionally in place in the sickle bar opening thereby enabling the blade section to be assembled on the bolts and the nuts threaded onto the bolts without risk of the bolts falling out of the sickle bar during assembly of the blade section and tightening of the nuts.

SUMMARY OF THE INVENTION

The punch press tool of the present invention includes an elongated handle having a pair of rigidly interconnected, parallel links pivotally connected to one end thereof with the links being spaced apart to straddle a sickle bar. A removable transverse pin is engaged with end portions of the links in spaced relation to the end of the handle with the transverse pin being positioned below the sickle bar when the handle and attached ends of the links are positioned above the sickle bar. The handle includes a projecting heat treated pin having a short pointed end thereon spaced from the pivot axis of the handle to engage the end of a broken bolt in a sickle bar, or the upper end of a bolt from which the nut has been removed, to force the bolt downwardly out of the opening in the sickle bar when the handle is pivoted toward the sickle bar.

The tool also is used to force a new shouldered bolt upwardly into the sickle bar opening with the round head of the bolt engaging flush with the bottom of the sickle bar. In this use, the transverse pin is removed and the handle and its pivotal connection with the links are positioned below the sickle bar with the links straddling and extending above the sickle bar. The removable transverse pin is inserted through the ends of the links above the sickle bar. The handle includes an edge surface having a protruding end edge to engage and initially move the bolt into an opening in the sickle bar. The edge surface of the handle also includes a short flat surface which finishes movement of the bolt into flush engagement with undersurface of the sickle bar and frictionally locks the bolt in the sickle bar opening.

The present invention enables the efficient replacement of a sickle blade section without removal of the sickle bar or strap. In this procedure, a single guard is removed thereby providing sufficient space to utilize the tool of the present invention to punch out a shouldered bolt, even if broken. Then a new bolt can be inserted by exerting pressure on the round head of the new bolt to force the bolt shoulder into the opening in the sickle bar or strap to frictionally retain the bolts in the sickle bar. A new blade section is then placed on the bolts and retaining nuts are placed on the upper ends of the bolts.

It is therefore an object of the present invention to provide a punch press tool for replacing sickle bar blade section retaining bolts when the bolts have been broken or when the retaining nuts on the upper ends of the bolts have been removed to enable a new blade section to be mounted on the sickle bar or strap without removing the sickle bar or strap from the mower or other implement with one guard being temporarily removed to provide access to the upper and lower surfaces of the sickle bar in the area where the blade section is to be replaced.

Another object of the invention is to provide a punch press tool including an elongated handle having a pair of laterally spaced, parallel links pivotally mounted at one end thereof with the links being spaced apart sufficiently to straddle the sickle bar or strap. The ends of the links spaced from the pivotal connection with the handle includes aligned apertures receiving a removable transverse pin positioned on the opposite surface of the sickle bar or strap from the pivotal connection of the links to the pivotal handle.

A further object of the invention is to provide a punch press tool in accordance with the preceding objects in which the end of the handle includes a radially projecting pin having a sharp point at its outer end. The pin with sharp point is spaced from the axis of the pivotal connection between the handle and links. A removable transverse pin is engaged with outer ends of the links to enable the pivotal connection between the links and handle to be placed either above or below the sickle bar or strap. When the handle is placed above the sickle bar or strap, the projecting pin thereon can be aligned with the end of the bolt, even if broken, and downward pressure exerted on the handle forces the bolt downwardly out of the opening in the sickle bar or strap. When a new bolt is being placed in the sickle bar or strap, the handle and the pivotal connection with the links are positioned below the sickle bar with the links straddling and extending above the sickle bar to enable the removable transverse pin to be inserted through the upper ends of the links above the sickle bar. When positioning the handle below the sickle bar, the handle is flipped over to position the radial pin on the handle remote from the bolt head and position the end edge of the edge surface of the handle adjacent to the bolt head. The bolt can then be manually placed in the sickle bar opening and held in position with one hand with the other hand pivoting the handle upwardly. This will engage the end edge of the edge surface of the handle with the bolt head. Further pivotal movement of the handle upwardly exerts upward force on the bolt head by a juncture point between the end edge of the handle and an adjacent eccentric flat surface. Movement of the bolt head into flush engagement with the undersurface of the sickle bar causes the shoulder on the bolt to frictionally and lockingly engage with the periphery of the opening in the sickle bar to enable a new blade section to be placed on the bolts and nuts placed on the bolts and tightened.

A still further object of the invention is to provide a punch press tool which materially reduces the down time of a farm implement or other apparatus utilizing a reciprocating sickle bar with blade sections mounted thereon by enabling removal of shouldered bolts, either broken or with the nuts removed, and then placing new shoulder bolts in position for attachment of a new blade section in an efficient, effective and less time consuming manner.

Yet another object of this invention to be specifically enumerated herein is to provide a punch press tool in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompany drawings forming a part hereof, wherein like numerals refer to like parts throughout.

DESCRIPTION OF THE PREFERRED EMBODIMENT

Although only one preferred embodiment of the invention is explained in detail, it is to be understood that the invention is not limited in its scope to the details of construction and arrangement of components set forth in the following description or illustrated in the drawings. Also, in describing the preferred embodiment, specific terminology will be resorted to for the sake of clarity. It is to be understood that each specific term includes all technical equivalents which operate in a similar manner to accomplish a similar purpose.

Figure 1:
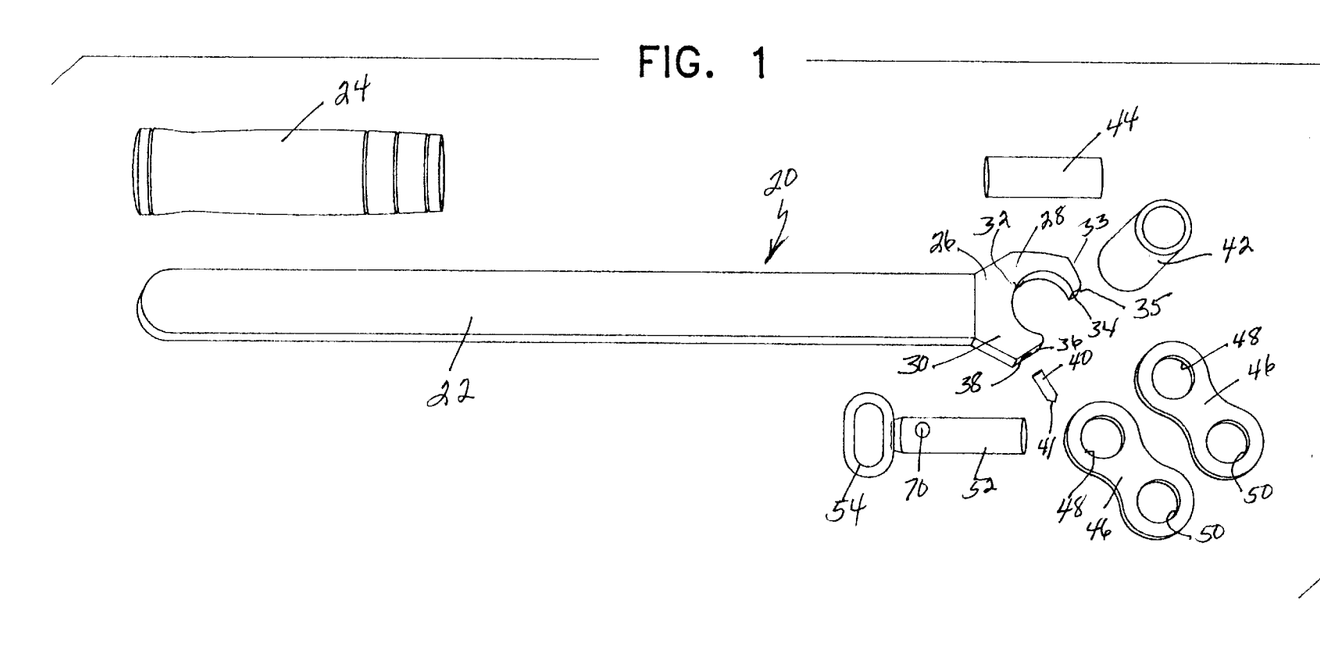
FIG. 1 is an exploded group perspective view of the components of a punch press tool in accordance with the present invention.
Figure 2:
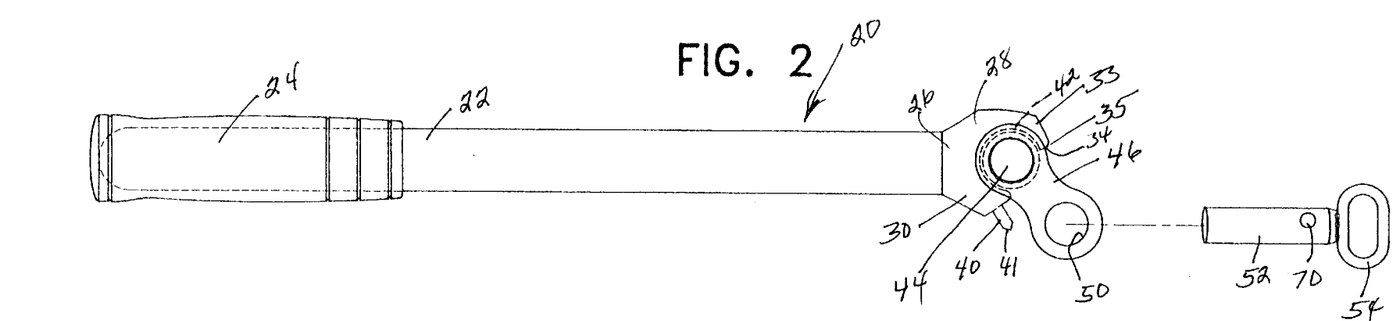
FIG. 2 is a side elevational view of an assembled tool in accordance with the present invention in which the removable transverse pin is separated from the links at the end of the tool.

The punch press tool of the present invention is illustrated in disassembled condition in FIG. 1 and is generally designated by reference numeral 20. The tool 20 includes an elongated handle 22 generally in the form of a metal bar of rectangular cross-sectional configuration. The handle 22 includes a handgrip 24 of substantially rigid but somewhat resilient material telescoped onto or molded onto one end of the handle to enable the handle to be easily and comfortably gripped and handled. The end of the handle 22 remote from the handgrip 24 includes a plate structure 26 including legs 28 and 30 terminating in spaced relation to each other and defining a partial circular opening 32.

Figure 10:
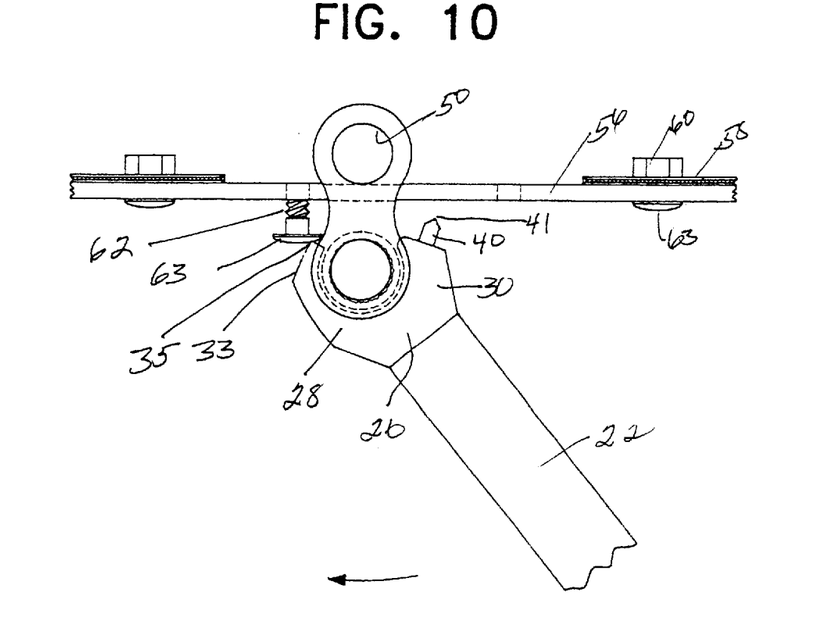
FIG. 10 is a side elevational view illustrates the tool of FIG. 9 with the links moved upwardly into straddling relation to the sickle bar without the removable transverse pin being in place and with the end edge of the edge surface of the handle engaging the bolt head.
Figure 11:
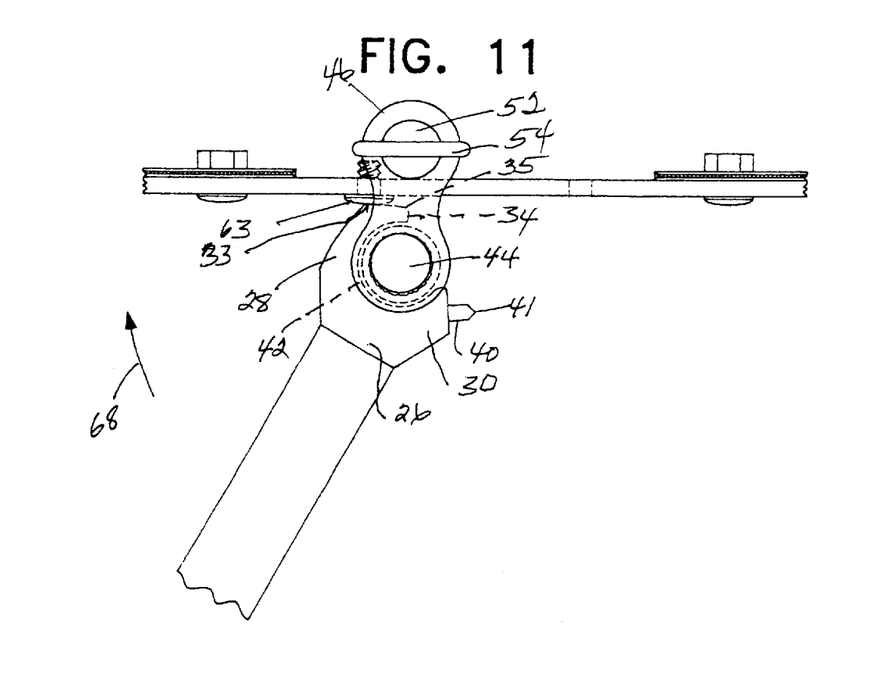
FIG. 11 is a side elevational view similar to FIG. 10 illustrating the final position of the components with the flat surface area adjacent the end edge of the handle being moved in a manner to force the shoulder bolt completely into the opening in the sickle bar.

The leg 28 extends a greater distance around the inner periphery of the opening 32 than leg 30 and terminates in a flat end edge 34. A flat edge surface area 33 extends from the end edge 34 and the juncture between flat edge 34 and flat surface area 33 forms a protruding point or edge 35. The flat end edge 34 and protruding point or edge 35 initially moves the bolt 62 upwardly into the opening 66 in the sickle bar 56 as shown in FIG. 10. The flat area 33 then moves the bolt 62 to final position as shown in FIG. 11.

Figure 6:
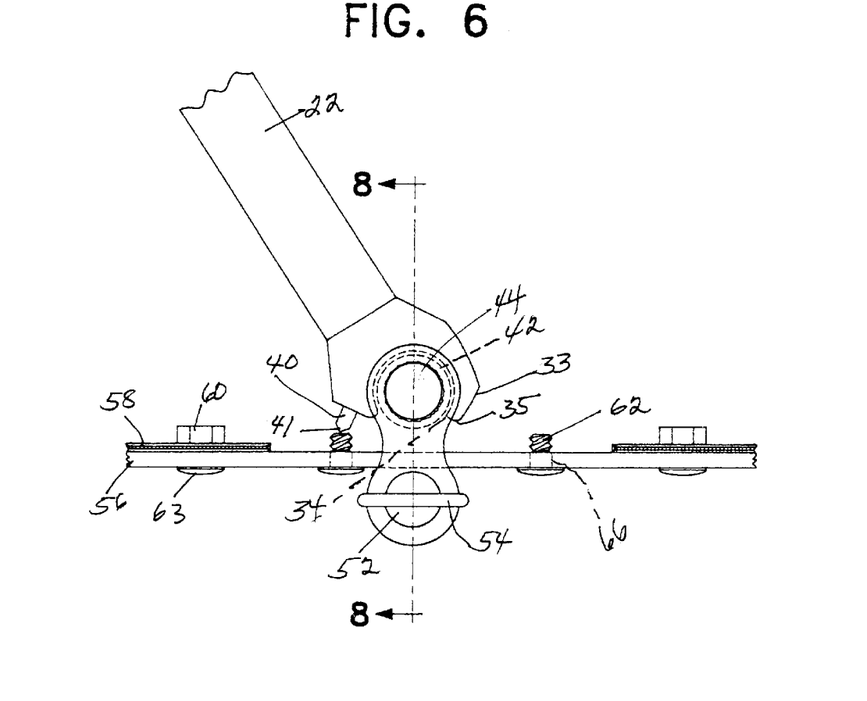
FIG. 6 is a partial elevational view illustrating the final position of a tool in accordance with the present invention with the removable transverse pin inserted and the pointed radially extending pin on the end of the handle engaging the upper end of a bolt to be removed from the sickle bar.
Figure 7:
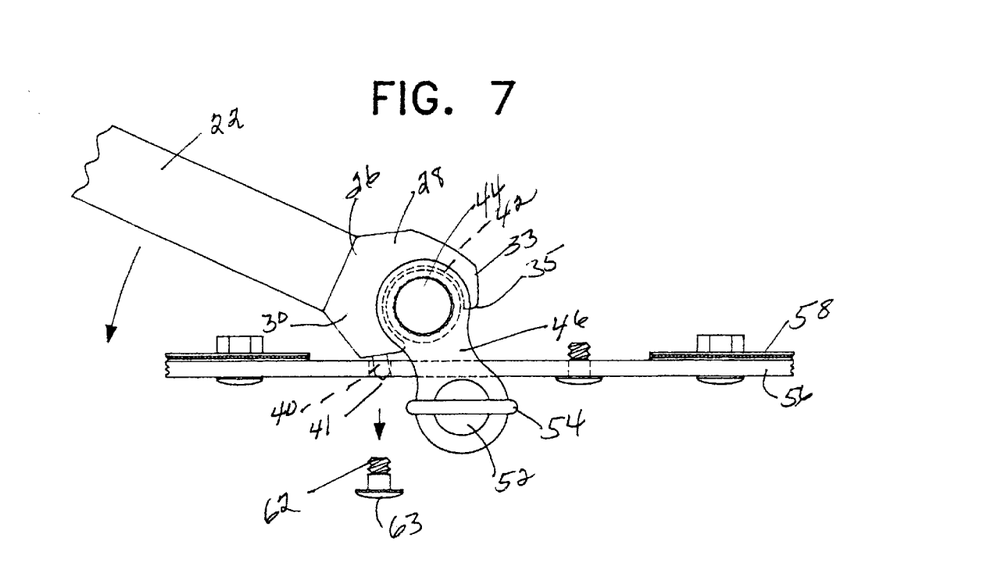
FIG. 7 is a side elevational view of the tool in FIG. 6 illustrating the manner in which the handle is pivoted to cause the radially extending pin on the handle to force the bolt from the hole in the sickle bar.
Figure 8:
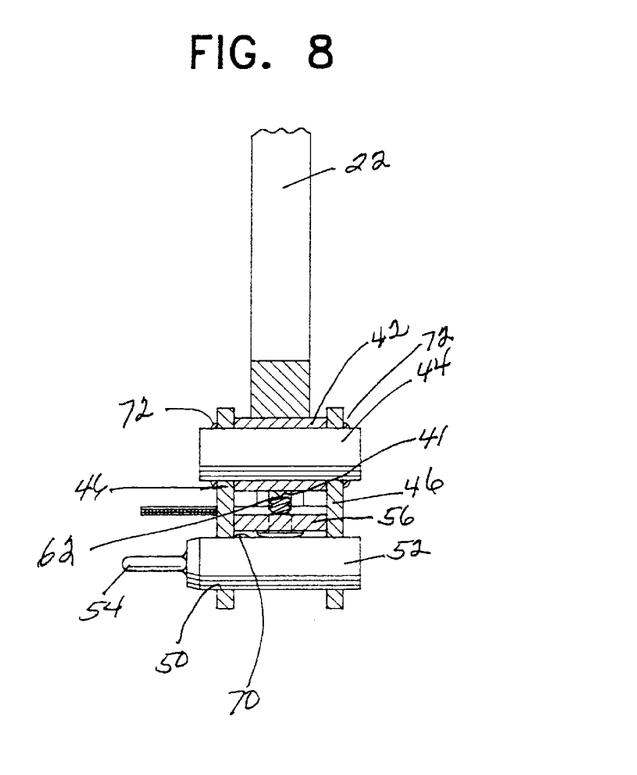
FIG. 8 is a vertical sectional view taken along section line 8—8 of FIG. 6 illustrating the structure of the links, the pivotal connection to the handle, the removable transverse pin and the association with the sickle bar and bolt.

The leg 30 extends a shorter distance around the inner periphery of the opening 32 than leg 28 and terminates in a flat end edge 36. The end edge 36 includes a recess 38 for permanently receiving a radially extending pin 40 therein. The pin 40 includes a short tapered and sharpened point 41 and extends beyond the end edge 36 of the leg 30 as illustrated in FIGS. 2–7. The opening 32 defines a partial cylindrical surface receiving a cylindrical sleeve 42 therein with the inner circumference of the partial opening 32 extending around more than one-half of the outer circumference of the sleeve 42 thereby securing the sleeve 42 in the opening 32. A cylindrical shaft 44 extends through the sleeve 42 and extends beyond the ends of the sleeve 42 as illustrated in FIG. 8.

A pair of parallel links 46 are mounted on shaft 44. Each link 46 includes a circular opening 48 in one end and a similar circular opening 50 in the other end. The openings 48 are positioned on and pivotally supported by the shaft 44 which extends through the sleeve 42 thus maintaining the links 46 in spaced parallel relation as illustrated in FIG. 8. The openings 50 in links 46 removably receive a removable transverse pin 52 having a loop handle 54 on one end. The transverse pin 52 is cylindrical and dimensioned to be received in the openings 50 when the links 46 are oriented in straddling relation to a sickle bar 56 as illustrated in FIG. 8.

Figure 3:
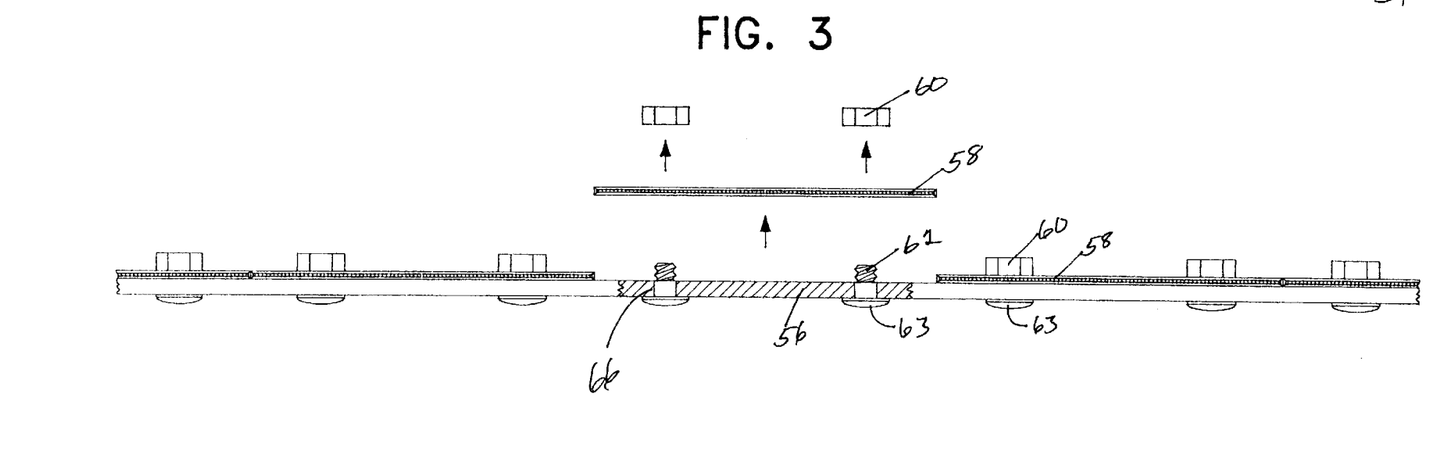
FIG. 3 is a schematic sectional view of the sickle bar illustrating the manner in which the retaining nuts and the blade section are removed.

FIG. 3 illustrates a sickle bar 56 having section blades 58 with one blade 58 removed from bar 56 by removing the retaining nuts 60 on the shouldered round headed bolts 62. In some instances, a blade section 58 hitting a solid obstruction will shear the bolts 62 so that the upper end of each sheared bolt is approximately flush with the upper surface of the sickle bar 56.

Figure 4:
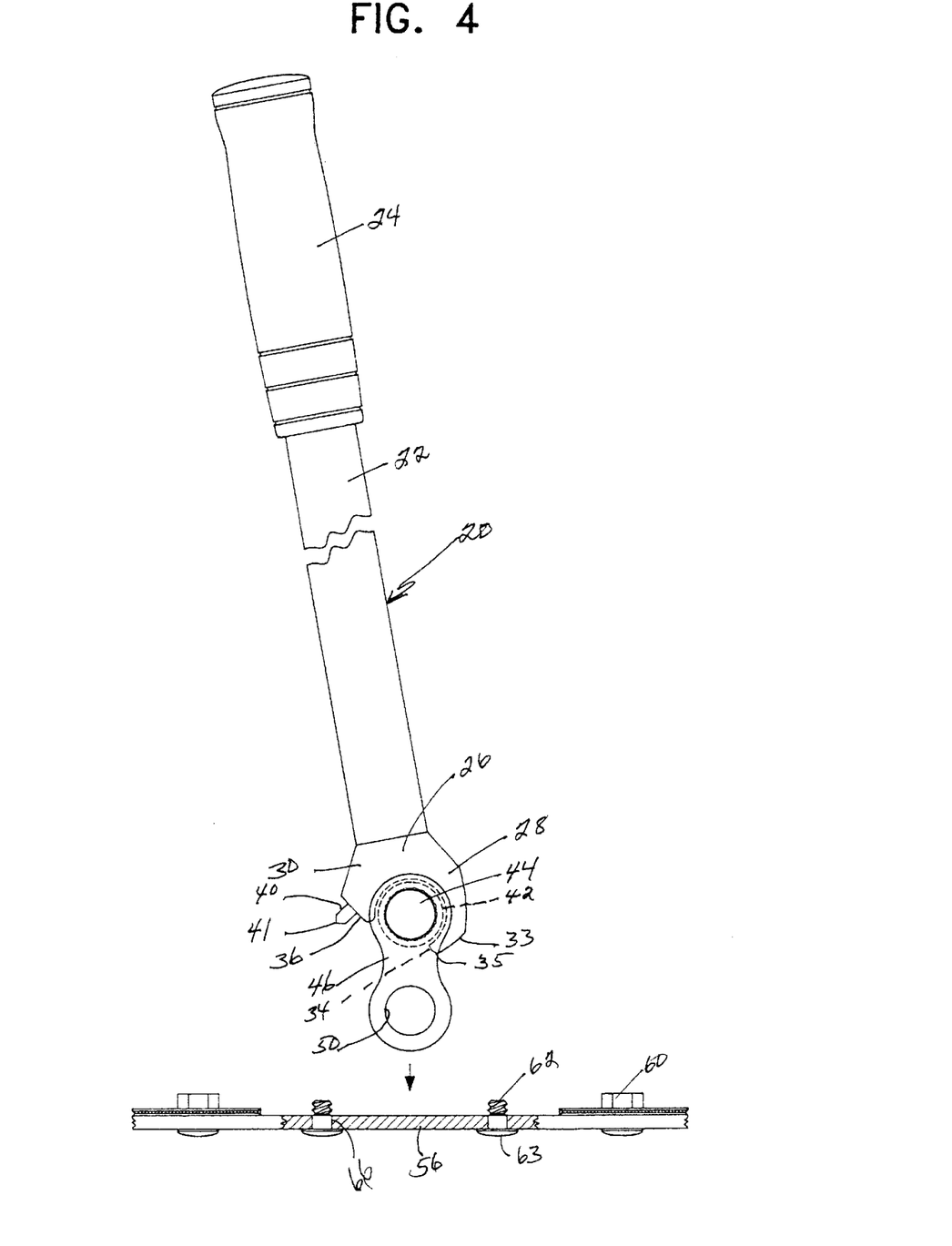
FIG. 4 is a schematic view illustrating the manner in which the tool, with the removable transverse pin removed in accordance with the present invention, is placed above the sickle bar and links moved downwardly into straddling relation to the sickle bar.
Figure 5:
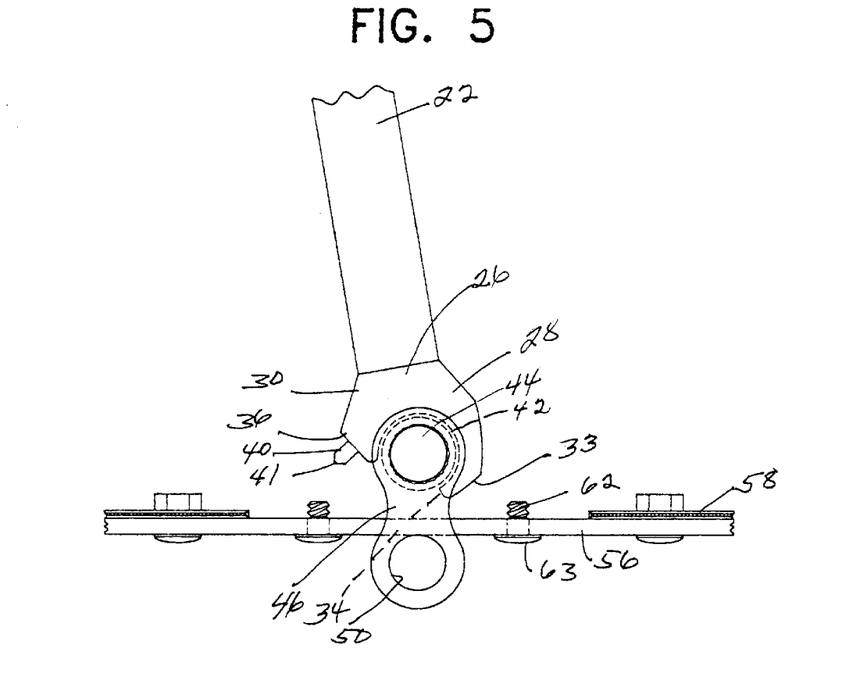
FIG. 5 is a schematic elevational view illustrating the manner in which the links of the tool in accordance with the present invention straddle the sickle bar.

When removing a bolt 62, either sheared or with the nuts 60 removed, the tool 20 of the present invention is associated with the sickle bar 56 by moving the links 46 downwardly into straddling relation to the sickle bar 56 as illustrated in FIGS. 4 and 5. The removable transverse pin 52 is then inserted through the opening 50 in the lower end of each of the links 46 as illustrated in FIG. 6 and the handle 22 of the tool 20 is pivoted counterclockwise so that the pointed end 41 of pin 40 comes into contact with the upper end of the bolt 62 as illustrated in FIG. 7. The heat treated pointed end 41 of pin 40 digs into the end of bolt 62 to effectively retain pin 40 in contact with the end of bolt 62. The handle 22 is then moved further in a counterclockwise direction as indicated by the arrow 64 in FIG. 7 thus forcing the bolt 62 downwardly out of the opening 66 in the sickle bar 56. The second bolt which secures the blade section 58 to the sickle bar 56 is then removed in the same manner by reversing the tool 20 so that the pin 40 will be directed toward the second bolt 62.

Figure 9:
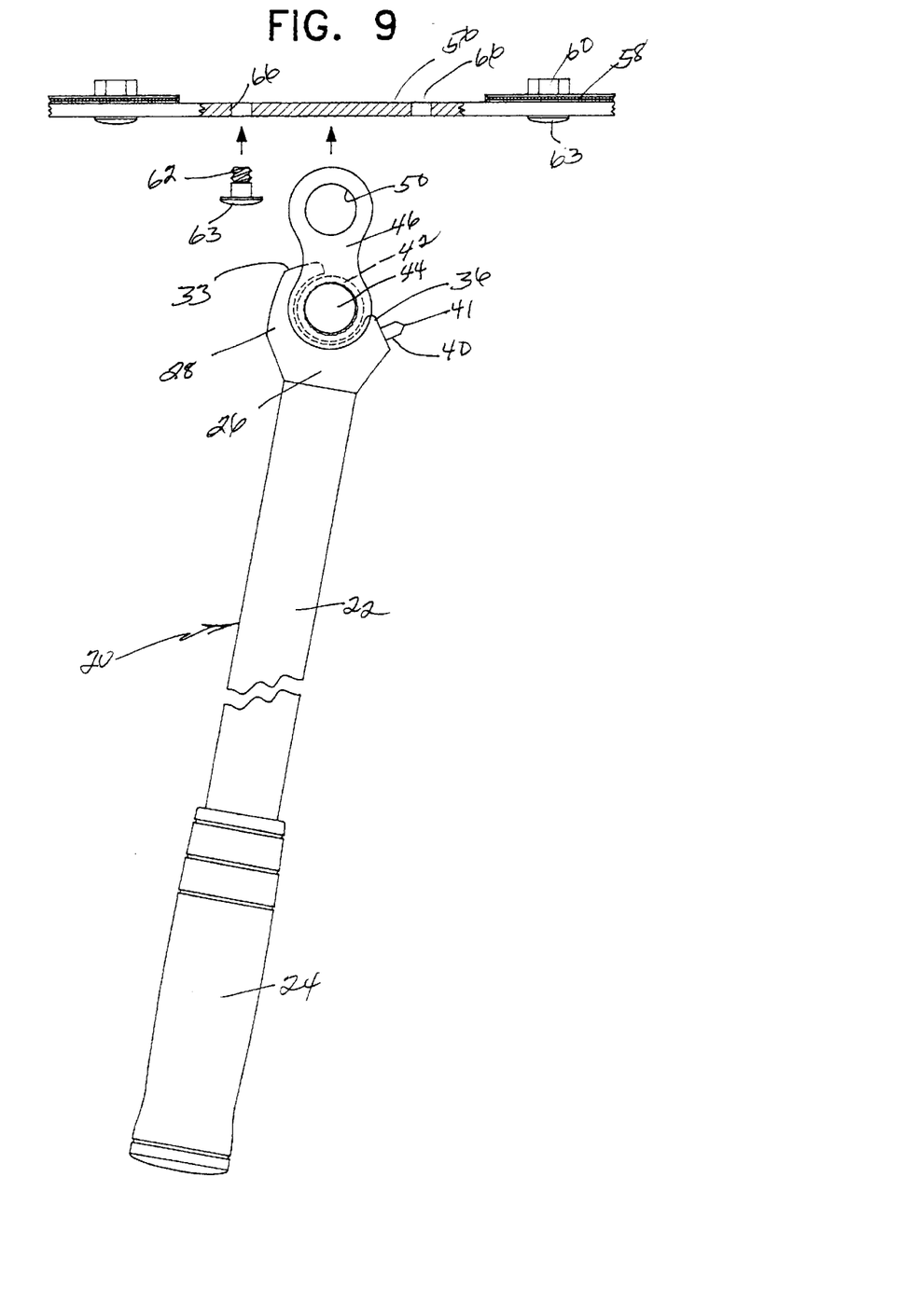
FIG. 9 is a side elevational view of the tool in accordance with the present invention illustrating the position of the handle and links below the sickle bar when placing a shouldered bolt into the sickle bar from below the sickle bar.

As illustrated in FIGS. 9–11, in order to insert new shoulder bolts 62 into the opening 66 in sickle bar 56, the tool 20 is flipped or rotated 180° about its longitudinal axis from its position in FIGS. 4–7 and with the transverse pin 52 removed, the tool 20 is positioned below the sickle bar 56 and the links 46 are moved upwardly into straddling relation to the sickle bar 56 as illustrated in FIG. 9 to the position illustrated in FIG. 10. The transverse pin 52 is then placed in the holes 50 in the links 46 above the sickle bar 56. In this position, the tool 20 is supported by the sickle bar 56 with the flat end surface 34, juncture point or edge 35 and flat surface area 33 located adjacent round bolt head 63 and radial pin 40 is on the opposite side of the pivot axis defined by shaft 44. The tool 20 can be shifted along sickle bar to position the tool 20 in optimum position. This arrangement enables a new bolt 62 to be positioned upwardly into opening 66 in sickle bar 56 as illustrated in FIG. 10 by using one or both hands with one hand holding the bolt after insertion. The other hand can grasp the handle 22 and move the flat end surface 34 into engagement wit the round head 63 of bolt 62 as illustrated in FIG. 10. Clockwise pivotal movement of handle 22 will engage the juncture edge or point 35 and flat surface area 33 with the round bolt 63 to move the bolt into sickle bat opening 66 with the bolt head 63 flush against the undersurface of sickle bar 56. The shoulder on bolt 62 will frictionally engage the periphery of opening 66 and lock the bolt 62 to the sickle bar 56. The second bolt is inserted in the same manner by reversing the position of the tool so that the sickle bar includes two threaded portions of bolts 62 extending above the sickle bar 56 to receive a new section blade 58 and nuts 60 to retain the new section blade 58 in position.

Also as illustrated in the drawings, the width of the section blade 58 and the dimensional characteristics of the punch press tool 20 are such that the tool can be used in the space on the sickle bar 56 that is covered by a single blade section thereby necessitating the removal of only one blade guard through which the removed and replaced section blade reciprocates. This structure enables easy replacement of a section blade without removing the sickle bar from the cutter bar of the mower in the field by removing only a single guard and then utilizing the tool in the area of the sickle bar that received the section blade being replaced. The punch press tool of this invention has dimensional characteristics to enable the tool to be associated with the sickle bar to either remove the bolts or replace the bolts and pivot the handle in such a manner to properly use the punch press tool within the confines of the sickle bar between section blades on opposite sides of the section blade being removed and replaced.

The removable transverse pin 52 includes a spring ball detent 70 adjacent the handle end 54 to releasably retain the pin 52 through the openings 50 in the links 46 when assembled therewith. The spring ball detent 70 passes through an opening 50 and engages the inner edge thereof to retain the pin 52 in position while manipulating the tool 20 and enabling easy removal of the pin 52 when necessary.

As illustrated in FIG. 8, the sleeve 42 has an external diameter to enable it to be moved longitudinally into the partial circular opening 32 in the plate 26 at the end of the handle 22. The diameter of the openings 48 in the links 46 closely receive the ends of shaft 44 which extends through the sleeve 42 thus pivotally supporting the links 46 from the ends of the shaft 44 which extend just through the openings 48. A retaining weld or other securing structure 72 connects the ends of the shaft 44 and outer surface of each link 46 for retaining the sleeve 42, shaft 44 and links 46 in assembled relation. The ends of sleeve 42 abut the inner surface of links 46 to retain links 46 in spaced parallel fixed relation and spaced from plate 26 to enable the links 46 to easily straddle the sickle bar 56 when moving the punch press tool 20 onto the sickle bar 56 from either the top or bottom as illustrated in FIGS. 4 and 9.

The punch press tool 20 constructed in accordance with the present invention is especially useful when it becomes necessary to replace a blade section bolt when changing a sickle blade section. The dimensions of the punch press tool are such that when replacing a sickle blade section, it is only necessary to remove the old blade section and the sickle bar guard associated with the removed blade section. FIG. 3 illustrates the removal of the sickle blade section to be replaced with the retaining nuts 60 removed and the shoulder bolts 62 remaining in position. The guard (not shown) relating to the blade section 58 to be replaced is also removed but the guards associated with adjacent blade sections do not have to be removed. FIG. 4 illustrates the punch press tool 20 of the present invention being associated with the sickle bar 56 and the bolts 62 with the spaced parallel links 46 being moved downwardly in straddling relation to the sickle bar 56 and the handle 22 oriented in an upwardly extended position. FIG. 5 illustrates the final position of the links 46 in straddling relation to the sickle bar 56. FIG. 6 illustrates the insertion of the transverse pin 52 through the openings 50 in the lower ends of the links 46 and below sickle bar 56. Pivotal movement of the handle 22 in counterclockwise direction brings the sharpened point 41 on pin 40 into engagement with the bolt 62. The pointed end 41 of pin 40 maintains engagement with the upper end of bolt 62 even if the bolt has been broken by digging into the end of the bolt. The links 46 and handle 22 can be moved longitudinally of the sickle bar 56 in order to properly align the pin 40 with the bolt 62 so that the point at the pin 40 engages the end of the bolt 62.

FIG. 7 illustrates the next step in removing the bolt 62 by moving the handle 22 downwardly as indicated by the arrow 64 thus punching the bolt 62 out of the bolt hole 66 in the sickle bar 56. The second bolt 62 can be removed by removing the transverse pin 52 and reversing the position of the punch press tool in order to align the pin 40 with the upper end of the second blade section bolt. This enables easy removal of the section blade bolts in order to facilitate replacement of the blade section bolts even if they have been sheared due to contact of the blade section with a rock or some similar stationary obstruction. The pin 40 is preferably heat treated and when downward pressure is applied to the outer end of the bolt by exerting arcuate pressure on handle 20, the sharpened point 41 on pin 40 digs into the end of the bolt 62 with enough pressure being applied to force the bolt 62 down and out of the aperture 66 in the sickle bar.

In order to place new shouldered bolts in the sickle bar 56 to attach a new blade section, the tool is positioned below the sickle bar 56 as illustrated in FIG. 9 and the links 46 are moved upwardly into straddling relation to the sickle bar 56 with the transverse pin 52 then being inserted through the apertures 50 in the upper ends of the links and above the sickle bar 56. The tool then can hang freely allowing both hands to be free to place a new bolt 62 in place as illustrated in FIGS. 9 and 10. With one hand holding the bolt 62 in place from the top surface of the sickle bar 56, the other hand can pivot the tool handle 22 and move the flat end surface 34, point 35 and surface area 33 into contact with the rounded head 63 of the bolt 62 as illustrated in FIGS. 10 and 11. Pressure is then applied on the handle 22 in an upward pivotal motion as indicated by arrow 68 in FIG. 11 thereby using the eccentric relation between the flat area 33 and point or edge 35 and the pivotal axis of handle 22 to force the shouldered portion of the bolt 62 upwardly until the head 63 of the bolt is engaged flush with the undersurface of the sickle bar 56 with the shouldered portion of bolt 62 frictionally and lockingly engaging opening 66 in sickle bar 56. The second bolt for the blade section is assembled in the sickle bar aperture 66 by reversing the orientation of the tool and repeating the above steps. After the bolts 62 are installed, a replacement blade section is positioned on the bolts 62 and the retaining nuts 60 are applied to the bolts to secure the new blade section in place and the guard which was removed to provide access to the sickle bar, blade section and bolts is also replaced in a conventional manner.

The elongated handle 22 which pivots about an axis centrally of shaft 44 and the openings 48 in the upper ends of the links 46 can apply substantial force to the bolts 62 when removing or replacing the bolts due to the mechanical advantage provided by the relatively short distance between the pin 40 and pivot axis of the handle 22 as compared to the distance between the pivot axis of the handle and the handgrip 24 thereby enabling sufficient pressure to be exerted for disengaging the shoulder portion of the bolt 62 when removing the bolt 62. Likewise, the short distance between the pivot axis of the handle 22 and the flat end surface 34, the juncture edge or point 35 and flat surface area 33 provides sufficient force to insert the shoulder portion of the bolt 62 into opening 66, without applying large force on handle 22, when installing a new bolt with the interference fit between the shoulder of the bolt 62 and the aperture 66 serving to hold the bolt in place while the nuts are being removed or placed on the bolts.

The punch press tool of the present invention enables efficient replacement of a blade section in the field thereby reducing the down time of the mower, windrower, swather, combine or other farm implement utilizing a reciprocating sickle bar with multiple blade sections and guards associated therewith. The tool also enables a blade section to be replaced by removing only one guard and the blade section to be replaced without removing the sickle bar lengthwise from the mower or other farm implement. Also, the tool enables gradual exertion of force on the bolt during removal or insertion of a new bolt to reduce the possibility of injury to a user of the tool as well as reducing the force necessary to be applied to the handle to remove and reinsert section blade bolts.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A punch press tool for removing and replacing retaining fasteners securing sickle blade sections to a sickle bar, said tool comprising a pair of spaced links for straddling a sickle bar and extending above or below the sickle-bar, a removable transverse pin inserted through said links at one end thereof in adjacent relation to one surface of said sickle bar, an elongated handle pivotally connected to said links at another end thereof in adjacent relation to another surface of said sickle bar, a fastener engaging member on said pivotal handle in spaced relation to the pivotal connection between said handle and links for engaging and exerting force on said sickle blade section fasteners to remove and replace said fasteners.

2. The punch press tool as defined in claim 1, wherein said fastener engaging member on said handle includes a projection in close radially spaced relation to the pivotal connection of said handle to said links to exert a force downwardly on a blade section fastener when removing the fastener and exerting a force upwardly on a blade section fastener when inserting a replacement fastener.

3. The punch press tool as defined in claim 2, wherein said sickle blade section retaining fasteners include a shouldered round headed bolt extending upwardly through an opening in a sickle bar and an opening in a sickle blade section and a retaining nut on the upper end of said bolt, said projection on the handle including a projecting pin for engaging an upper end of a threaded bolt after the nut has been removed to remove a threaded bolt from the sickle bar.

4. The punch press tool as defined in claim 3, wherein said projecting pin is heat treated and provided with a tapered point at an end thereof for engaging with a threaded end of a bolt.

5. The punch press tool as defined in claim 1, wherein said fastener engaging member on said handle includes a projection in close radially spaced relation to the pivotal connection of said handle to said links to exert a force upwardly on a blade section fastener, said sickle blade section retaining fasteners including a shouldered round headed bolt extending upwardly through an opening in a sickle bar and an opening in a sickle blade section and a retaining nut on the upper end of said bolt, said projection on the handle including a radially protruding surface area on an edge of said handle in closely spaced relation to the pivotal connection of said handle to said links for engaging the head of said round headed bolt to exert an upward force on said round head of said bolt.

6. The punch press tool as defined in claim 1, wherein said removable transverse pin includes a handle at one end thereof and a detent engaging a peripheral edge of an opening in the ends of said links remote from the pivotal connection between the links and handle.

7. The punch press tool as defined in claim 1, wherein said pivotal connection between the links and handle includes a transverse sleeve connected to the handle and received between the ends of the links remote from the removable pin, a shaft extending through the sleeve and openings in the ends of the links to pivotally connect the links to the handle, said shaft including end structure which retains the shaft assembled with the links, sleeve and handle thereby connecting the sleeves to the handle in laterally spaced parallel relation to enable the links to straddle the sickle bar and move longitudinally thereon thereby enabling the handle and removable transverse pin to be oriented with either the removable pin or handle being above or below said sickle bar when removing said fasteners or when replacing said fasteners.

8. A hand tool for removing and replacing blade sections on a reciprocal sickle bar comprising an elongate handle having a structure pivotally connected at one end for engagement with a sickle bar on a surface opposite to the position of the handle in relation to the sickle bar, a first and a second projection means on said handle being on opposite sides of a pivot axis of the handle and in spaced relation to the pivot axis to engage a blade section fastener by said first projection means to exert a downward force on the fastener to downwardly remove the fastener when the handle is located above the sickle bar and to engage a new fastener by said second projection means to exert an upward force on said new fastener to install said new fastener when the handle is located below the sickle bar.

9. The tool as defined in claim 8, wherein said first projection means on the handle is a projecting heat treated pin having a pointed tapered end for engagement with a threaded or broken end of a fastener securing a blade section to a sickle bar.

10. The tool as defined in claim 8, wherein said second projection means on the handle is a protruding surface area on an edge of said handle in closely spaced relation to the pivotal connection of said handle for engaging a round head of a new fastener member inserted upwardly into said sickle bar to exert an upward force thereon.

11. A hand tool for removing and replacing blade sections on a reciprocal sickle bar comprising an elongate handle having a structure pivotally connected at one end for engagement with a sickle bar on a surface opposite to the position of the handle in relation to the sickle bar, projection means on said handle in spaced relation to a pivot axis of the handle to engage a blade section fastener to exert a downward force on the fastener to downwardly remove the fastener when the handle is located above the sickle bar and exert an upward force on a new fastener to install said new fastener when the handle is located below the sickle bar, wherein said structure pivotally connected at one end of said handle includes a pair of rigidly spaced parallel links, one end of said links being pivotally connected to one end of said handle and oriented in straddling relation to a sickle bar, a transverse pin removably inserted through said links at another end of said links remote from the pivotal connection between the handle and links to enable the handle and removable transverse pin to be positioned selectively above and below the sickle bar for removing and replacing blade section retaining bolts.

12. The tool as defined in claim 11, wherein said removable transverse pin includes a loop handle on one end thereof and a detent in the external surface for engagement with an opening in one of said links.

13. The tool as defined in claim 11, wherein said one end of said handle includes a transverse opening, a sleeve mounted in said opening and extending beyond the handle with opposite ends thereof abutting said links to maintain the links in spaced parallel relation, and a shaft extending through said sleeve and openings in the end of said links to connect the links to the handle.

14. The tool as defined in claim 13, wherein said shaft including outer ends extending beyond said links and being rigidly connected to said links to retain the links in rigid, spaced, and parallel relation.

15. A hand tool for removing or replacing a fastener in a support member comprising an elongated handle member having a structure pivotally connected at one end for engagement with the support member on a surface opposite to the position of the handle member in relation to the support member, a first and a second projection means on said handle member in spaced relation to a pivot axis of the handle member to engage the fastener in an opening of the support member by said first projection means to exert a downward force on the fastener to downwardly remove the fastener from the opening when the handle is located above the support member and to engage a new fastener by said second projection means to exert an upward force on said new fastener to install said new fastener when the handle member is located below the support member.

16. The tool as defined in claim 15, wherein said first projection means on the handle member is a projecting heat treated pin having a pointed tapered end for engagement with a threaded or broken end of the fastener in the support member.

17. The tool as defined in claim 15, wherein said second projection means on the handle member is a protruding surface area on an edge of said handle member in closely spaced relation to the pivotal connection of said handle member for engaging a head of a new fastener inserted upwardly into said support member to exert an upward force thereon.

18. The tool as defined in claim 15, wherein said structure pivotally connected at one end of said handle member includes a pair of rigidly spaced parallel links, one end of said links being pivotally connected to one end of said handle member and oriented in straddling relation to the support member, a transverse pin removably inserted through said links at another end of said links remote from the pivotal connection between the handle member and links to enable the handle member and removable transverse pin to be positioned selectively above and below the support member for removing and replacing the fastener.

19. The tool as defined in claim 18, wherein said removable transverse pin includes a loop handle on one end thereof and a detent in the external surface for engagement with an opening in one of said links.

20. The tool as defined in claim 18, wherein said one end of said handle member includes a transverse opening, a sleeve mounted in said opening and extending beyond the handle member with opposite ends thereof abutting said links to maintain the links in spaced parallel relation, and a shaft extending through said sleeve and openings in the end of said links to connect the links to the handle member.

* * * * *